United States Patent
Cheng et al.

(10) Patent No.: US 12,363,136 B1
(45) Date of Patent: Jul. 15, 2025

(54) DETECTION OF UNAUTHORIZED INTERNET OF THINGS DEVICES IN A COMPUTER NETWORK

(71) Applicant: Trend Micro Incorporated, Tokyo (JP)

(72) Inventors: Daniel Cheng, Taipei (TW); Zhonglin Liu, Nanjing (CN); Patrick Shi, Nanjing (CN); Jeff Jiang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 534 days.

(21) Appl. No.: 17/134,967

(22) Filed: Dec. 28, 2020

(51) Int. Cl.
*H04L 9/40* (2022.01)
*H04L 41/0604* (2022.01)
*H04L 41/22* (2022.01)
*G06N 3/045* (2023.01)

(52) U.S. Cl.
CPC ...... *H04L 63/1416* (2013.01); *H04L 41/0627* (2013.01); *H04L 41/22* (2013.01); *H04L 63/0236* (2013.01); *H04L 63/1425* (2013.01); *G06N 3/045* (2023.01)

(58) Field of Classification Search
CPC . H04L 63/1416; H04L 41/0627; H04L 41/22; H04L 63/0236; H04L 63/1425; G06N 3/045
See application file for complete search history.

(56) References Cited

U.S. PATENT DOCUMENTS

| 9,600,571 | B2 | 3/2017 | Shaashua et al. |
| 9,801,000 | B2 | 10/2017 | Shao |
| 10,064,123 | B2 | 8/2018 | Bari |
| 2011/0107108 | A1* | 5/2011 | Hirai ............... H04N 21/8355 713/189 |
| 2016/0212099 | A1* | 7/2016 | Zou ........................ H04L 63/08 |
| 2017/0330054 | A1* | 11/2017 | Fu ........................... G06V 10/82 |

(Continued)

FOREIGN PATENT DOCUMENTS

| EP | 3 501 190 B1 | 6/2020 |
| JP | 2003345243 A | * 12/2003 |

OTHER PUBLICATIONS

Meidan et al. Detection of unauthorized IoT devices Using Machine Learning Techniques. crXiv (Year: 2017).*

(Continued)

*Primary Examiner* — Farid Homayounmehr
*Assistant Examiner* — Mudasiru K Olaegbe
(74) *Attorney, Agent, or Firm* — Beyer Law Group LLP

(57) ABSTRACT

Disclosed are a system and method for detecting an unauthorized Internet of things (IoT) device in a private computer network. Packets of network traffic are collected in the private computer network. An IoT packet is identified from among the collected packets. IoT data is extracted from the IoT packet and encrypted. The encrypted IoT data is transmitted to an artificial neural network in the cloud over the public Internet. The artificial neural network infers, based on the encrypted IoT data, a device type of an IoT device that transmitted the IoT packet in the private computer network. The IoT device is detected to be unauthorized in response to detecting that the device type of the IoT device is not a recognized IoT device type in the private computer network.

7 Claims, 5 Drawing Sheets

(56) References Cited

U.S. PATENT DOCUMENTS

| | | | |
|---|---|---|---|
| 2018/0034913 A1* | 2/2018 | Matthieu | H04L 67/52 |
| 2018/0063079 A1* | 3/2018 | Ding | H04L 63/0464 |
| 2018/0191729 A1* | 7/2018 | Whittle | H04L 63/0227 |
| 2018/0357542 A1* | 12/2018 | Wu | G06N 3/04 |
| 2019/0278937 A1* | 9/2019 | Streit | H04L 9/3231 |
| 2019/0312721 A1* | 10/2019 | Yuen | G06F 21/602 |
| 2020/0059976 A1* | 2/2020 | Bhatia | H04W 8/005 |
| 2020/0244297 A1* | 7/2020 | Zalewski | H04L 67/10 |
| 2021/0150266 A1* | 5/2021 | Sarpatwar | G06F 18/24 |
| 2021/0203615 A1* | 7/2021 | Roy | H04L 47/6255 |

OTHER PUBLICATIONS

Meidan et al. "Detection of Unauthorized IoT Devices Using Machine Learning Technique" (Year: 2017).*

Meidan et al. "Detection of unauthorized IoT Devices Using machine learning techniques" Singapore University of Technology and Design. p. 3 (Year: 2017).*

* cited by examiner

DETECTION OF UNAUTHORIZED INTERNET OF THINGS DEVICES IN A COMPUTER NETWORK

BACKGROUND OF THE INVENTION

1. Field of the Invention

The present invention relates generally to cybersecurity, and more particularly but not exclusively to cybersecurity involving Internet of things devices.

2. Description of the Background Art

Internet of things (IoT) devices are everyday objects with an embedded computer that allows for data communication over a computer network. However, general computing is not the primary function of an IoT device. Examples of IoT devices include smart versions of cameras, household appliances, sensors, light bulbs, etc. When deployed in a computer network, IoT devices allow for monitoring, automation, and other tasks.

Unlike a general-purpose computing device, such as a laptop or desktop computer, an IoT device does not have enough computing resources to run cybersecurity software. More particularly, an IoT device typically only has enough computing resources to perform its limited function. This makes IoT devices, and thus the computer network in which they are deployed, vulnerable to attacks.

SUMMARY

Disclosed are a system and method for detecting an unauthorized Internet of things (IoT) device in a private computer network. In one embodiment, packets of network traffic are collected in the private computer network. An IoT packet is identified from among the collected packets. IoT data is extracted from the IoT packet and encrypted. The encrypted IoT data is transmitted to an artificial neural network in the cloud over the public Internet. The artificial neural network infers, based on the encrypted IoT data, a device type of an IoT device that transmitted the IoT packet in the private computer network. The IoT device is detected to be unauthorized in response to detecting that the device type of the IoT device is not a recognized IoT device type in the private computer network.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
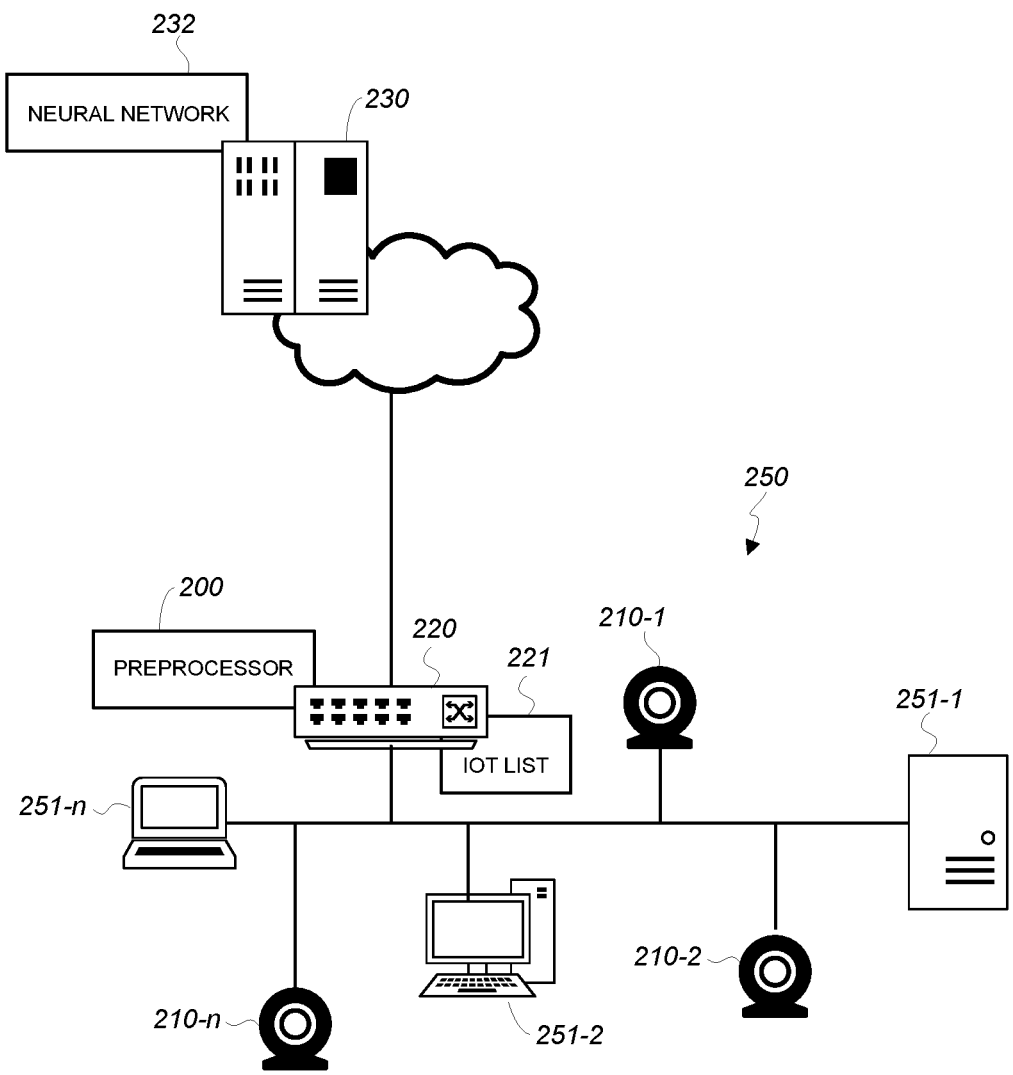
FIG. 1 shows a logical diagram of a computer network in accordance with an embodiment of the present invention.

FIG. 1 shows a logical diagram of a computer network 250 in accordance with an embodiment of the present invention. The computer network 250 is a private computer network in that it is not available to the general public. The computer network 250 may be an enterprise network or a home network, for example. The computer network 250 may include a plurality of computers 251 (i.e., 251-1, 251-2, . . . ) and a plurality of Internet of things (IoT) devices 210 (i.e., 210-1, 210-2, . . . ). A computer 251 is a general-purpose computing device, such as a laptop computer, server computer, desktop computer, etc. An IoT device 210 is a commercially-available IoT device, such as a smart camera, smart household appliance, smart factory equipment, fitness tracker, etc.

In the example of FIG. 1, the computer network 250 further includes a security computer 220. The security computer 220 may be a security appliance, server computer, router, or other computing device for providing cybersecurity to a computer network. The security computer 220 may include a preprocessor 200 and an IoT list 221. The preprocessor 200 may comprise instructions that when executed by a processor (e.g., central processing unit (CPU)) of the security computer 220 cause the security computer 220 to monitor and collect packets of network traffic in the computer network 250, identify IoT packets from the collected packets, extract IoT data from the IoT packets, encrypt the IoT data, and forward the encrypted IoT data over the public Internet to an artificial neural network 232 in the cloud.

The IoT list 221 may comprise a listing of recognized (i.e., authorized) IoT devices 210 that are deployed in the computer network 250. The IoT list 221 may indicate an IoT device 210 by type, which in one embodiment is by its make (brand/manufacturer) and model. The IoT list 221 may be compiled by an Information Technology (IT) administrator of the computer network 250, for example. Because there are thousands of commercially-available IoT devices, and a given computer network has a relatively small number of IoT device types, an IoT device with a type (e.g., make and model) that is not on the IoT list 221 is highly likely to be unauthorized. An unauthorized IoT device may have been inserted in the computer network 250 by an attacker or inadvertently (e.g., by a careless personnel, family member, visitor).

One way of detecting unauthorized IoT devices is to deploy a dedicated device identification system in the computer network. However, such on premise device identification system may be too costly, especially for small or home networks. Forwarding network packets out of the computer network to a third-party device identification service in the cloud is more cost-effective but raises privacy concerns because network packets may contain personally identifiable information.

In the example of FIG. 1, a backend system 230 hosts an artificial neural network 232. The backend system 230 may comprise one or more servers of a cloud computing infrastructure, for example. The neural network 232 may be a deep machine learning model, such as a Capsule Neural Network (CapsNet), Convolutional Neural Network (CNN), etc. The neural network 232 may be trained using encrypted samples of IoT data of commercially-available IoT devices to infer an IoT device type that corresponds to an input encrypted IoT data.

The security computer 220 is configured to forward an encrypted IoT data to the backend system 230 over the public Internet. There, the encrypted IoT data is input to the neural network 232, which infers the device type that corresponds to the input encrypted IoT data, such as whether the input encrypted IoT data belongs to Class 1, Class 2, etc. The backend system 230 may include a mapping of classifications to IoT device types. For example, the mapping may indicate that Class 1 corresponds to IoT device type 1 (make 1, model 1), Class 2 corresponds to IoT device type 2 (make 2, model 2), etc. The neural network 232 may also output a confidence level associated with the inference.

The backend system 230 may report the inferred device type that corresponds to the input encrypted IoT data to the security computer 220. The security computer 220 may compare the inferred device type to the IoT list 221 to determine if the inferred device type is that of an IoT device that is expected to be in the computer network 250. The IT administrator may be alerted when the inferred device type is not in the IoT list 221, indicating that there is an unauthorized IoT device in the computer network 250.

It is possible that the neural network 232 is not able to infer a device type for an input encrypted IoT data, such as when the neural network 232 has not been trained with samples to identify the device type. In that case, the backend system 230 may so inform the IT administrator by sending a notification to the security computer 220. When the device type is a new make and model of an IoT device, as confirmed by the IT administrator, samples of IoT data of the IoT device may be collected and encrypted for retraining the neural network 232. Otherwise, the IT administrator may perform further investigation to find and isolate the corresponding IoT device.

Figure 2:
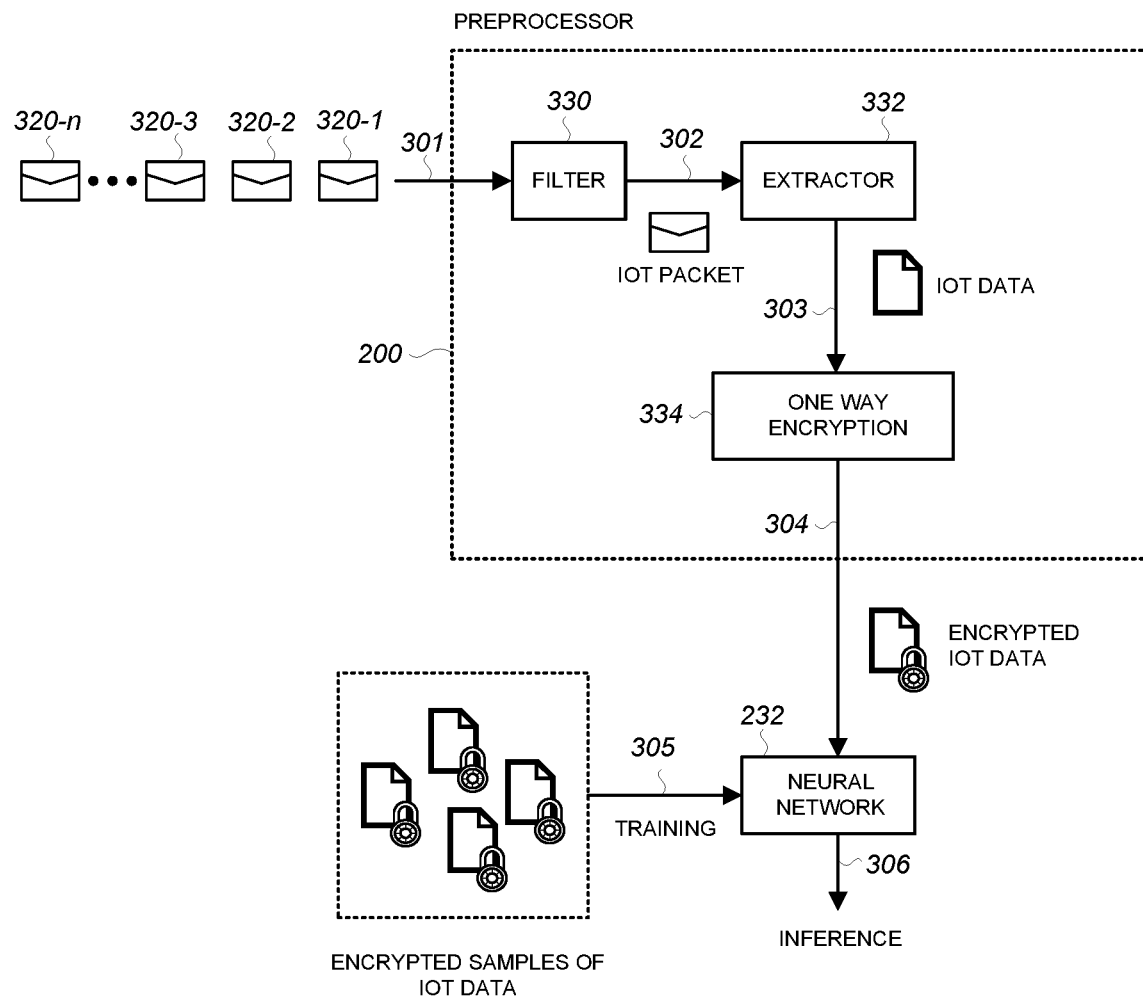
FIG. 2 show a logical diagram that pictorially illustrates a method of detecting an unauthorized Internet of things (IoT) device in a computer network in accordance with an embodiment of the present invention.

FIG. 2 shows a logical diagram that pictorially illustrates a method of detecting an unauthorized IoT device in the computer network 250 in accordance with an embodiment of the present invention.

In the example of FIG. 2, the preprocessor 200 is running in the security computer 220 (see FIG. 1). The security computer 220 monitors and collects packets 320 (i.e., 320-1, 320-2, . . . ) of network traffic in the computer network 250. The preprocessor 200 receives the collected packets 320 (see arrow 301). The preprocessor 200 may include a filter 330, an extractor 332, and an encryption module 334.

The filter 330 is configured to identify IoT packets (i.e., packets transmitted by IoT devices) from among the collected network packets 320. In one embodiment, the filter 330 includes filter patterns for identifying IoT devices by pattern matching. In one embodiment, the filter patterns are configured to detect the Medium Address Control (MAC) addresses of known IoT devices of different makes and models. Identified IoT packets are received by the extractor 332 (see arrow 302), which is configured to extract IoT data from an IoT packet (see arrow 303). In one embodiment, the extracted IoT data includes all of the contents of the IoT packet except for MAC address data.

The encryption module 334 receives the IoT data (see arrow 303). In one embodiment, the encryption module 334 encrypts the IoT data using a one-way encryption function, such as a one-dimensional convolution function. An example suitable one-dimensional convolution function is:

$$T_i = S_{2i-1} + S_{2i} \qquad (\text{EQ. 1})$$

where i=1, 2, . . . n, $S_i$ denotes the i-th byte of source input packet data, and $T_i$ denote the i-th byte of function output packet data. For example, assuming a source input packet data S with a packet length of 8, $$S=[12, 234, 5, 67, 89, 101, 112, 13],$$

that is S_1=12, S_2=234, . . . . Then, the function output packet data T will be:

$$T=[246, 72, 190, 125],$$

meaning T_1=S_1+S_2, T_2=S_3+S_4, . . . .

As can be appreciated, the encryption module 334 may also employ other suitable convolution functions without detracting from the merits of the present invention.

In one embodiment, a one-dimensional convolution function is employed to encrypt IoT data collected in the computer network 250 and the samples of IoT data that are used to train the neural network 232. An encrypted IoT data is transmitted from the security computer 220 to the backend system 230 (shown in FIG. 1) over the public Internet. In the backend system 230, the encrypted IoT data is input to the neural network 232 (see FIG. 2, arrow 304).

Continuing with FIG. 2, samples of IoT data of commercially-available IoT devices are collected for training the neural network 232. The samples of IoT data may be obtained by running various IoT devices and collecting their packets of network traffic in a laboratory environment. Samples of IoT data of various IoT devices may also be obtained from other sources, such as from manufacturers, open sources, etc. Generally speaking, IoT devices have distinguishable IoT data for identifying their type. Examples of distinguishable IoT data include indications of the cloud service the IoT device reports to, functionalities of the IoT device, the firmware version of the IoT device, network devices that the IoT device connect to, etc. In one embodiment, MAC address data are removed from the samples of IoT data, and the samples of IoT data are thereafter encrypted using the same encryption function employed by the encryption module 334. The resulting encrypted samples of IoT data are then used to train the neural network 232 to identify IoT device types based on encrypted IoT data (see arrow 305).

The neural network 232 receives the encrypted IoT data that was collected in the computer network 250 by the security computer 220 (see arrow 304). The neural network 232 generates an inference (see arrow 306), which indicates an inferred device type that corresponds to the encrypted IoT data. More particularly, the inference indicates the type of the IoT device that transmitted the IoT packet with the IoT data over the computer network 250. The neural network 232 may also provide a confidence level of the inference. The inference and the confidence level may be provided by the backend system 230 to the security computer 220 over the public Internet. The security computer 220 may compare the inferred device type to device types of IoT devices included in the IoT list 221. An inferred device type that is not included in the IoT list 221 indicates presence of an unauthorized IoT device in the computer network 250.

Figure 3:
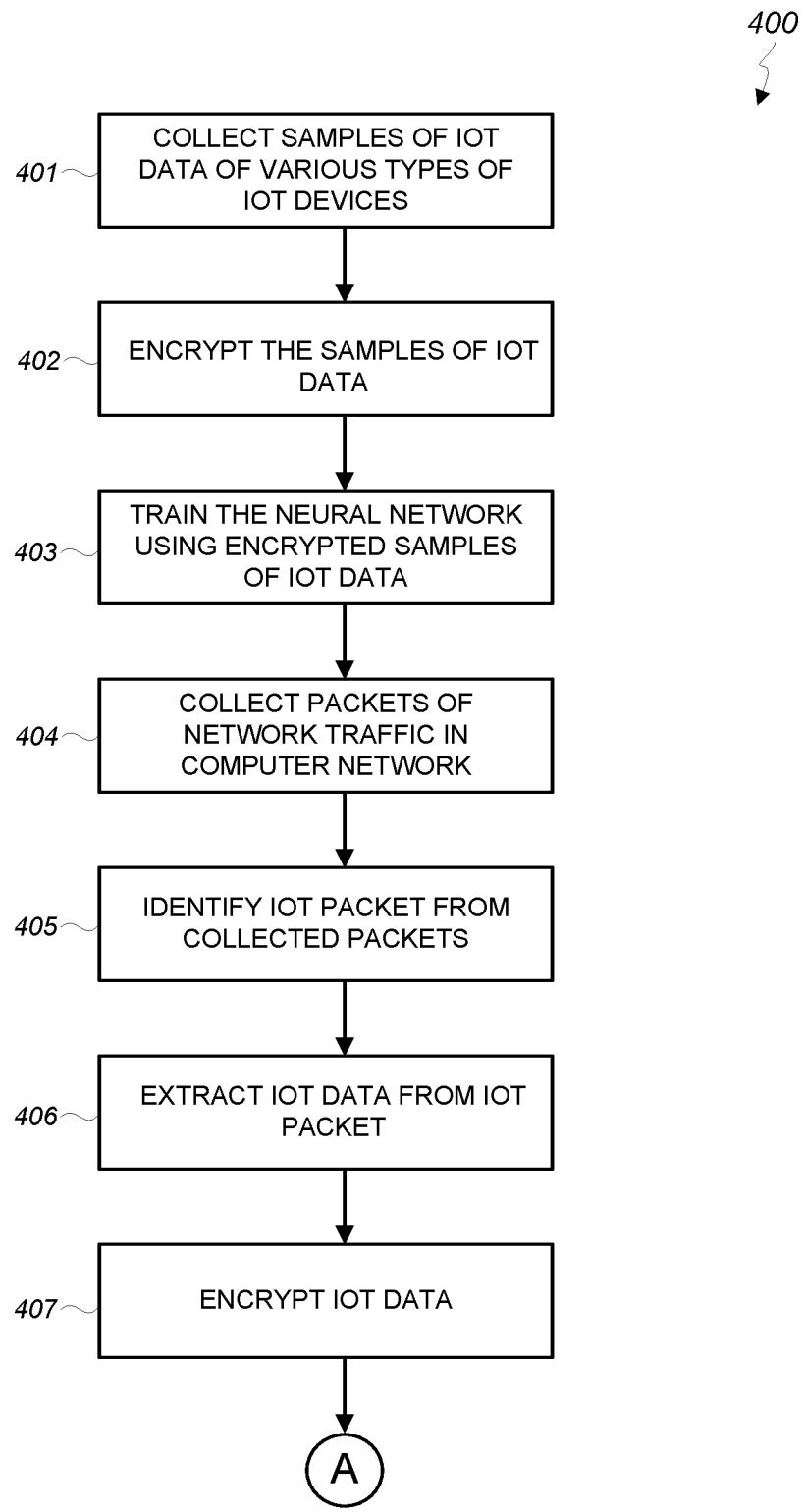
FIGS. 3 and 4 show a flow diagram of a method of detecting an unauthorized IoT device in a computer network in accordance with an embodiment of the present invention.
Figure 4:
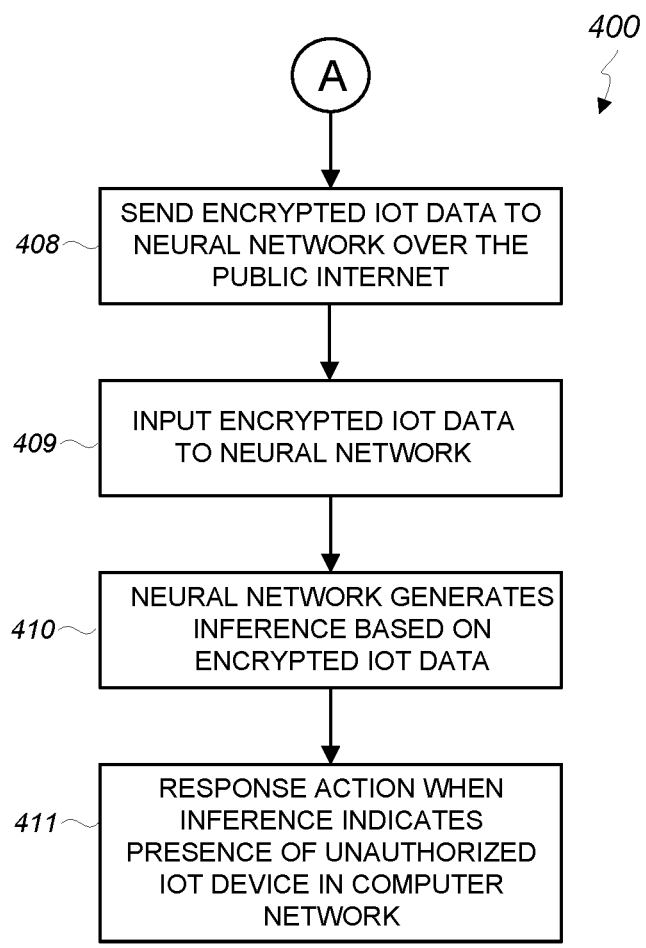

FIGS. 3 and 4 show a flow diagram of a method 400 of detecting an unauthorized IoT device in a computer network in accordance with an embodiment of the present invention. The method 400 is explained using previously disclosed components. As can be appreciated, other components may also be employed without detracting from the merits of the present invention.

Beginning with FIG. 3, samples of IoT data of various types of IoT devices are collected (step 401). The samples of IoT data are encrypted using a one-way encryption function, such as a one-dimensional convolution function, to generate encrypted samples of IoT data (step 402). The encrypted samples of IoT data are used to train an artificial neural network, such as a Capsule Neural Network (step 403). The neural network is trained to identify a type of an IoT device based on its IoT data, with the type being a make and model of the IoT device. The neural network is hosted by a backend system in the cloud.

Packets of network traffic are collected in a private computer network (step 404). The collected packets are filtered to identify an IoT packet transmitted by an IoT device over the private computer network (step 405). IoT data is extracted from the IoT packet (step 406). The IoT data is encrypted, to generate an encrypted IoT data, using the same one-way encryption function that was employed to encrypt the samples of IoT data (step 407).

Continuing with FIG. 4, the encrypted IoT data is transmitted to the neural network in the cloud over the public Internet (step 408). The encrypted IoT data is input to the neural network (step 409). The neural network generates an inference that indicates an inferred IoT device type based on the input encrypted IoT data (step 410). The inference is provided to the private computer network. An inferred IoT device type that is not recognized in the private computer network indicates presence of an unauthorized IoT device in the private computer network. That is, an inferred IoT device type that is not a device type of any of the authorized IoT devices in the private computer network indicates presence of an unauthorized IoT device. In one embodiment, recognized IoT device types are included in an IoT list for reference purposes. A response action may be performed in response to detecting an unauthorized IoT device (step 411). The response action may include alerting the IT administrator (e.g., by messaging, email, log entry, alert screen/window).

Figure 5:
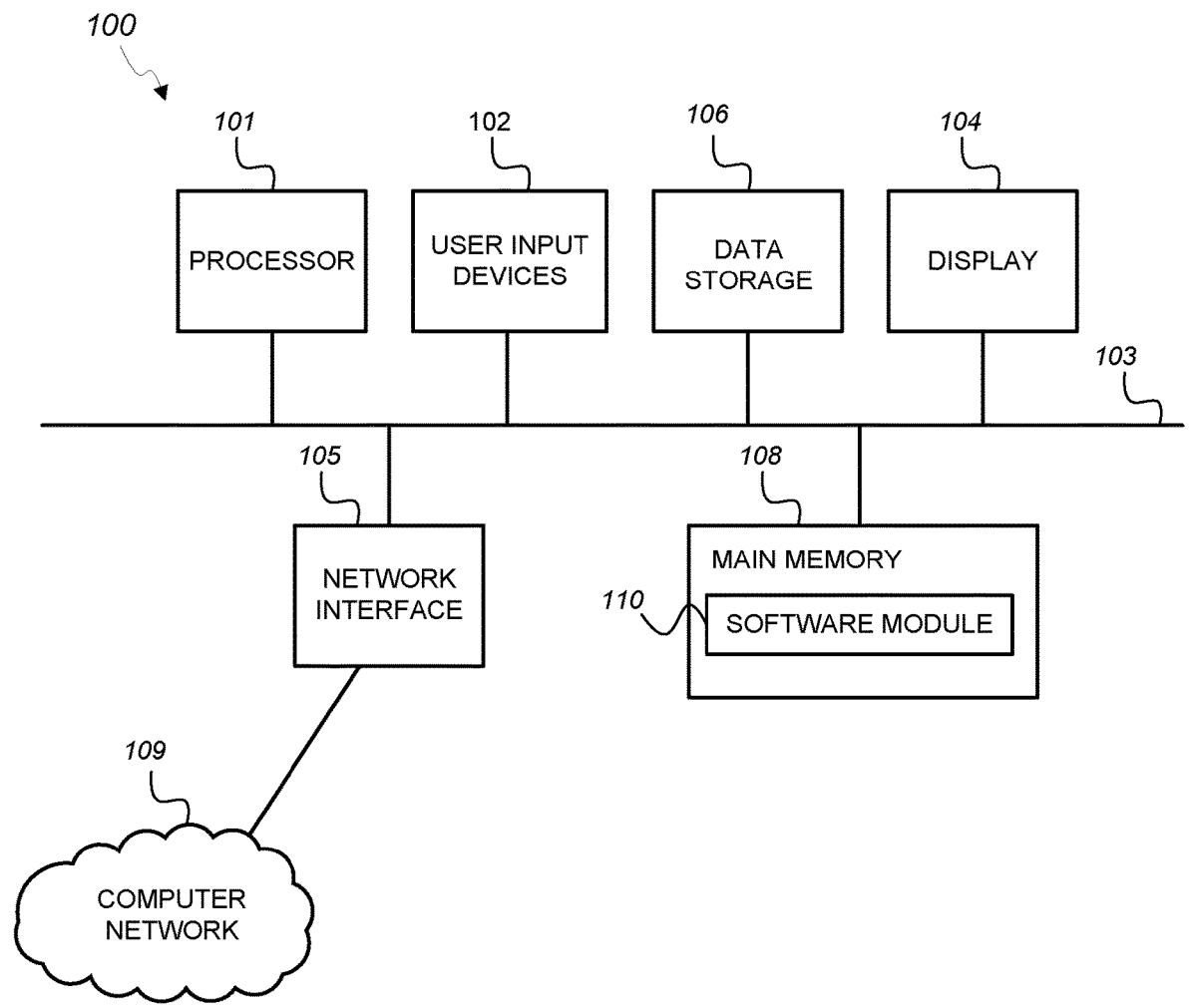
FIG. 5 shows a logical diagram of a computer system that may be employed with embodiments of the present invention.

Referring now to FIG. 5, there is shown a logical diagram of a computer system 100 that may be employed with embodiments of the present invention. The computer system 100 may be employed as a security computer or other computer described herein. The computer system 100 may have fewer or more components to meet the needs of a particular cybersecurity application. The computer system 100 may include one or more hardware processors 101 (e.g., CPU, microprocessor). The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a security computer, the software modules 110 comprise a preprocessor (e.g., preprocessor 200). In one embodiment where the computer system 100 is configured as a backend system, the software modules 110 comprise an artificial neural network (e.g., neural network 232).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting an unauthorized Internet of things (IoT) device in a computer network, the method comprising:

collecting a plurality of packets of network traffic in a private computer network;

identifying an IoT packet among the plurality of packets;

extracting IoT data from the IoT packet;

encrypting the IoT data using a one-way encryption function to generate an encrypted IoT data;

transmitting the encrypted IoT data to an artificial neural network in the cloud over the public Internet, wherein the artificial neural network has been trained using encrypted samples of IoT data of commercially-available IoT devices;

using the artificial neural network to infer, from the encrypted IoT data, a device type of an IoT device that transmitted the IoT packet;

comparing the device type of the IoT device to a listing of device types of IoT devices that are authorized to be in the private computer network; and detecting that the IoT device is not authorized to be in the private computer network in response to the device type of the IoT device not being in the listing of device types of IoT devices that are authorized to be type in the private computer network.

2. The method of claim 1, further comprising:

alerting an administrator of the private computer network in response to detecting that the IoT device is not authorized to be in the private computer network.

3. The method of claim 1, wherein the device type of the IoT device indicates a make and model of the IoT device.

4. The method of claim 1, wherein the IoT data includes all contents of the IoT packet except Medium Access Control (MAC) data.

5. The method of claim 1, wherein identifying the IoT packet among the plurality of packets comprises:

filtering the plurality of packets for MAC addresses of IoT devices.

6. The method of claim 1, wherein detecting that the IoT device is not authorized to be in the private computer network comprises:

transmitting an inference that indicates the device type of the IoT device from the artificial neural network in the cloud to the private computer network over the public Internet.

7. The method of claim 1, wherein the one-way encryption function is a one-way one-dimensional convolution function.

\* \* \* \* \*